(No Model.)
G. NOLL.
CARBONATOR.
No. 549,004. Patented Oct. 29, 1895.
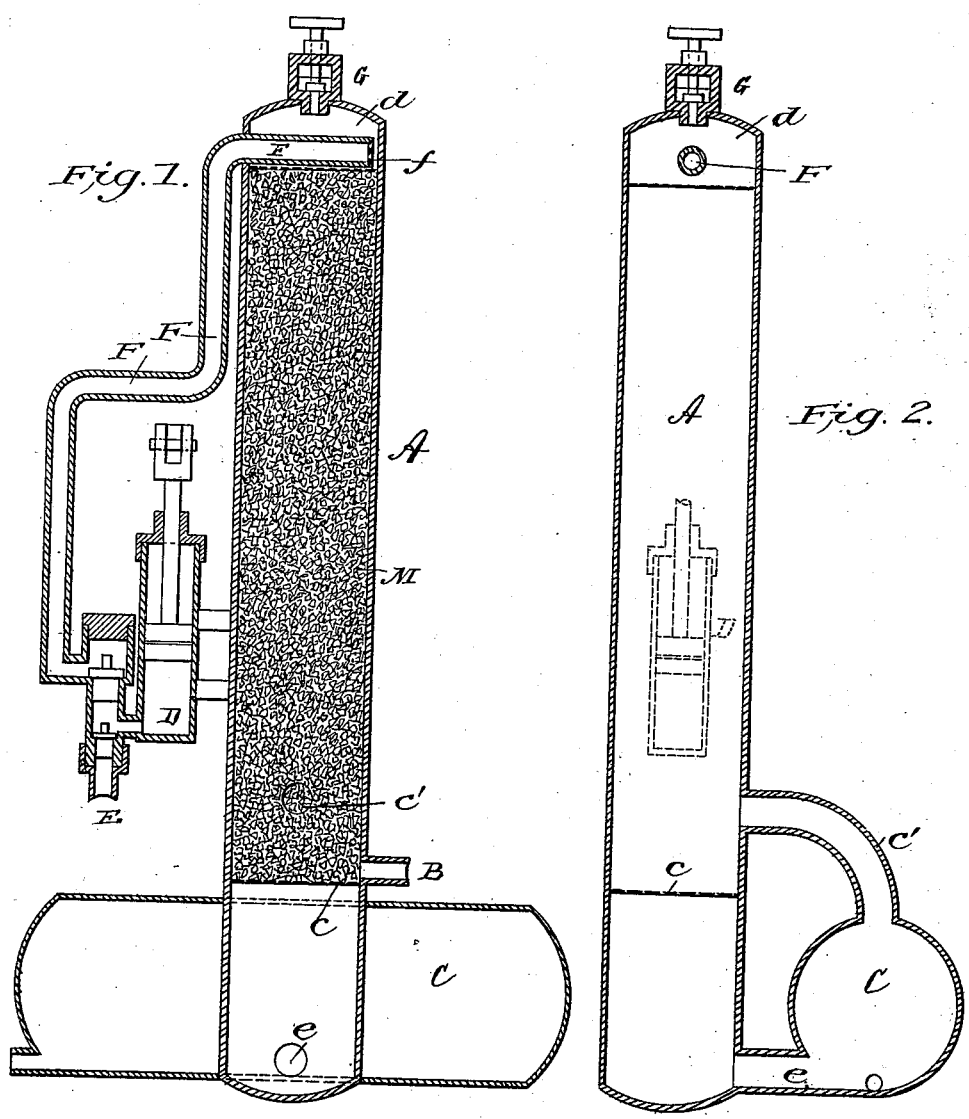
WITNESSES:
Theodore Becker.
Wm. Schulz.
INVENTOR
George Noll
BY
Roeder & Briesen
ATTORNEYS.

UNITED STATES PATENT OFFICE.

GEORGE NOLL, OF MINDEN, GERMANY, ASSIGNOR TO EMIL STAHL, OF NEW YORK, N. Y.

CARBONATOR.

SPECIFICATION forming part of Letters Patent No. 549,004, dated October 29, 1895.

Application filed September 25, 1893. Serial No. 486,384. (No model.) Patented in England June 24, 1889, No. 10,238.

*To all whom it may concern:*

Be it known that I, GEORGE NOLL, a citizen of Germany, and a resident of Minden, Prussia, Germany, have invented certain new and useful Improvements in Carbonators, (for which I have obtained a patent in England, No. 10,238, dated June 24, 1889,) of which the following is a specification.

This invention relates to an improved apparatus for charging liquids with carbonic-acid gas and in which the liquid is thoroughly subdivided, so that all of its particles become impregnated with the carbonic-acid gas.

In the accompanying drawings, Figure 1 is a vertical longitudinal section of my improved carbonator. Fig. 2 is a vertical section at right angles to Fig. 1 with the glass pieces removed.

The letter A represents an upright cylindrical vessel, into the upper end of which enters a pipe F, adapted for the dicharge of water into the vessel. This pipe is perforated at its discharge end, as at $f$, so that such water may be ejected into the vessel in a finely-divided state. The pipe is fed by a suitable pump D, that receives the water from a reservoir or aquaduct through supply-pipe E. At its lower end the vessel A is connected to an accumulator C, from which it is divided by a perforated partition $c$. This accumulator may be provided with a curved return-pipe $c'$, that enters the vessel A above the partition $c$, and which serves to conduct the gas out of the accumulator into the vessel A as such gas is displaced by the charged water.

B is the gas-pipe for delivering carbonic-acid gas to the bottom of vessel A immediately above the accumulator C. Between the pipe F and the diaphragm $c$ the vessel A is filled with a column M of small pieces or blocks of glass, porcelain, pumice-stone, coke, or a similar material, which is not soluble in water or carbonic acid. The blocks are loosely packed, so as to form intervening spaces and so that their surfaces are to a large extent exposed. Above the pipe F there is an air-space $d$, into which the air which is liberated and expelled from the finely-subdivided water is received. This air may be drawn off through cock G.

In use the water delivered through pipe F will flow downward from pipe F through vessel A, and will trickle from block to block, so as to be thoroughly subdivided and to expose a very large surface. The gas admitted by pipe B will flow upward and meet this finely-subdivided body of water flowing in an opposite direction. Thus the gas comes into contact with all the particles of water from the bottom to the top of the apparatus and is thoroughly absorbed in such a manner that a thoroughly-charged and a perfectly-uniform product free from air is obtained. The charged product passes through perforated partitions $c$ into the accumulator C, from which it is drawn from time to time by discharge-pipe $e$.

What I claim is—

The combination of an upright vessel, a perforated plate across the vessel, a column of loosely packed blocks in the vessel resting on the said plate, a water pipe having a perforated end and a source of supply therefor discharging into said vessel through said end at the top of said column, a gas pipe discharging into the vessel at the bottom of the column, an accumulator for the carbonated liquid placed at right angles to the said vessel, a pipe connecting said accumulator and said vessel, and a return pipe for the gas from said accumulator into the vessel, substantially as described.

Signed at Minden, in the Province of Westphalia and Empire of Germany.

GEORGE NOLL.

Witnesses:
D. LEUMZ,
EDWD. P. CRANE.